Figure 1:
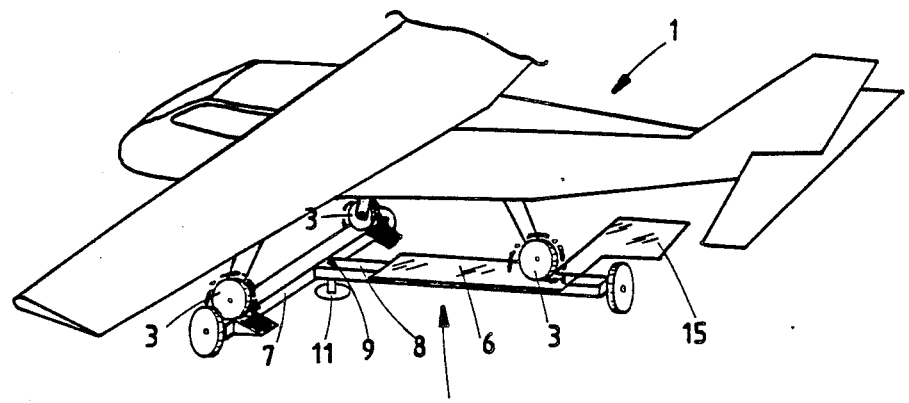

United States Patent [19]

Bardsen et al.

[11] Patent Number: 4,895,319
[45] Date of Patent: Jan. 23, 1990

[54] PARKING TROLLEY FOR LIGHT AIRCRAFT

[76] Inventors: Paul K. Bardsen, Johan Larsens vei 23, N-4230 Kopervik; Endre Haraldseide, Skogveien 41, N-4250 Kopervik, both of Norway

[21] Appl. No.: 286,890
[22] PCT Filed: Feb. 19, 1985
[86] PCT No.: PCT/NO88/00032
§ 371 Date: Dec. 19, 1988
§ 102(e) Date: Dec. 19, 1988
[87] PCT Pub. No.: WO88/08393
PCT Pub. Date: Nov. 3, 1988

[30] Foreign Application Priority Data

Apr. 27, 1987 [NO] Norway ................. 871735

[51] Int. Cl.$^4$ ............................................. B64F 1/22
[52] U.S. Cl. ....................................... 244/115; 244/50;
180/904; 414/426
[58] Field of Search ................... 244/114 R, 115, 116,
244/63, 50, 17.17; 180/14.7, 904; 414/426-430

[56] References Cited

U.S. PATENT DOCUMENTS

| | | | |
|---|---|---|---|
| 2,415,071 | 2/1947 | Brie | 244/115 |
| 2,463,744 | 3/1949 | Clemens | 244/115 |
| 2,980,270 | 4/1961 | Elliott et al. | 244/63 |
| 3,497,167 | 2/1970 | Adams et al. | 244/115 |
| 3,567,160 | 3/1971 | Adams et al. | 244/115 |
| 3,567,161 | 3/1971 | Adams et al. | 244/115 |
| 4,360,175 | 11/1982 | Mellblom et al. | 244/115 |

FOREIGN PATENT DOCUMENTS

| | | |
|---|---|---|
| 736557 | 6/1943 | Fed. Rep. of Germany . |
| 36607 | 1/1923 | Norway . |
| WO85/03685 | 8/1985 | PCT Int'l Appl. . |
| 970425 | 9/1964 | United Kingdom ............. 244/17.17 |

Primary Examiner—Galen L. Barefoot
Attorney, Agent, or Firm—Wood, Dalton, Phillips, Mason & Rowe

[57] ABSTRACT

A parking trolley for light aircraft (1) with a couple of landing wheels (3,3), and a nose or rear supporting wheel (3'), comprising a mainly T-shaped frame (2) with adjustable supporting surfaces (4, 5,6) for the landing wheels (3,3) and the supporting wheel (3'). The T-frame is supported by wheels (12,13,14) at the free ends of the frame, the wheels being adjustable and lockable in a position with the turning axes of the wheels in parallel for transport of the parking trolley and light aircraft on the trolley by the aid of a traction vehicle. Furthermore, wheels (12,13,14) are adjustable to positions with their turning axes directed as radii of a turning point (9), alternatively a turning point (10) at a distance from turning point (9), which is connected with an anchoring means (11) in the ground, via a turning bolt. Parking trolley (2) with an attached light aircraft may, consequently, turn about one of the turning points dependent on the effect of the wind on the light aircraft to turn the latter upwing like a wind vane.

8 Claims, 2 Drawing Sheets

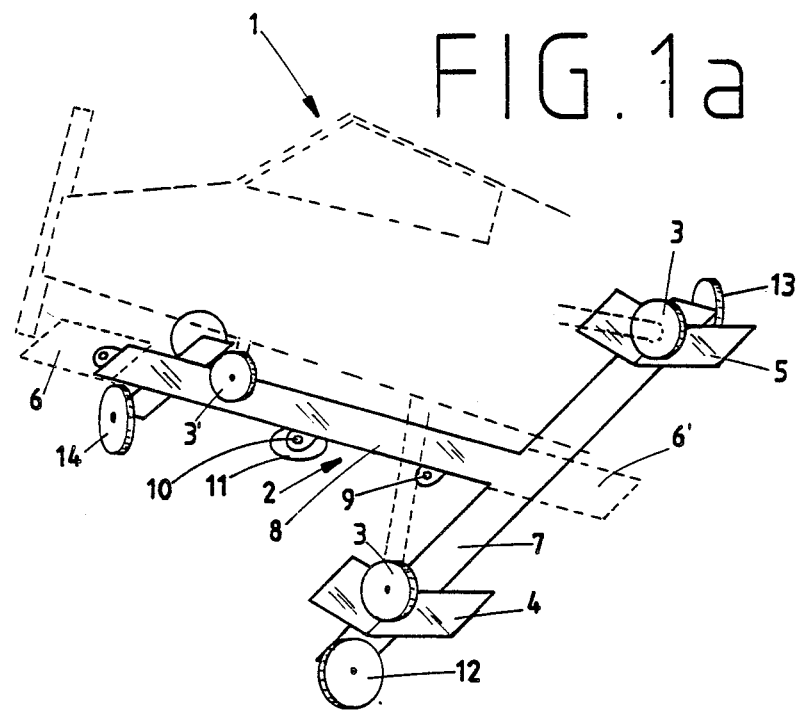

PARKING TROLLEY FOR LIGHT AIRCRAFT

The present invention relates to a parking trolley for light aircraft of the kind as stated in the preamble of the following independent claim 1.

Light aircraft are commonly anchored by guys when they are parked on the ground to be secured in case of wind. The guys are, on one hand attached to the aircraft and, on the other hand secured to anchoring members, e.g. concrete blocks, provided on the ground. Such a manner of parking is time consuming and bulky, as well as requiring hard work. Additionally, the aircraft rudder must be secured when the aircraft is parked, because strong wind aft may damage the rudder.

In order to ensure safe parking, such a parked light aircraft should stand upwind. This means that the parked light aircraft should be turned when the wind direction changes. Such constant supervising of light aircraft implies considerable strain both to private aircraft owners and to aero clubs, as well as to the servicemen in control towers on serviced airfields who must warn in case of sudden changes of the weather or when the wind direction turns 180° in case of strong wind.

It is previously known to provide light aircraft on a parking trolley as mentioned above in order to avoid the above mentioned problems in case of parked light aircraft when the wind is strong and variable, the aircraft being secured on the parking trolley which can turn freely about a turning point. The wind influencing the aircraft will, thus, turn the aircraft and, thus, the trolley upwind in the same manner as a wind vane.

A parking trolley of this kind is known from U.S. Pat. No. 4,360,175, but has not obtained a footing in Norway.

Disadvantages of said known parking trolley are that it is permanently attached to be rotatable at a defined place on the ground, and that the frame or carrier arms supporting the parked light aircraft are, in turn, supported by small elongated steel rollers rolling on the ground, so that the carrying arms extend at a low level to permit the aircraft to be run onto, and off the trolley. Said steel rollers which have a small diameter and form the wheels of the trolley are highly demanding as regards a smooth basis to permit even support on the carrying arms of the parking trolley, and to achieve a minimum of rolling friction permitting the parked light aircraft with the trolley to turn with the wind.

It is an object of the present invention to provide a parking trolley for light aircraft which does not show the above mentioned drawbacks and disadvantages, and which permits the parking trolley to be used as a transport trolley for light aircraft as well, at least over minor distances on the airfield.

According to the invention this is achieved by the characterizing features appearing from the characterizing part of the following independent claim 1, as well as the following dependent claims.

Such a turnable parking trolley with a parked light aircraft, as mentioned above, works according to a "wind vane principle" since said trolley/aircraft will alwise turn when influenced by any wind stronger than fresh breeze, so that the nose of the aircraft will always face the wind. The aircraft is, naturally, attached to the parking trolley in a suitable manner, and the parking trolley is safely secured to the ground while retaining its turnability. Consequently, all work in connection with previously used securing of the light aircraft by the aid of guys, as mentioned above, is avoided.

When the light aircraft is to be placed on the parking trolley it is preferably pulled onto the parking trolley by the aid of a winch, which is preferably mounted on the trolley.

To get down from the parking trolley the light aircraft may either taxi under its own power or it may be pulled by the aid of the winch.

Figure 2:
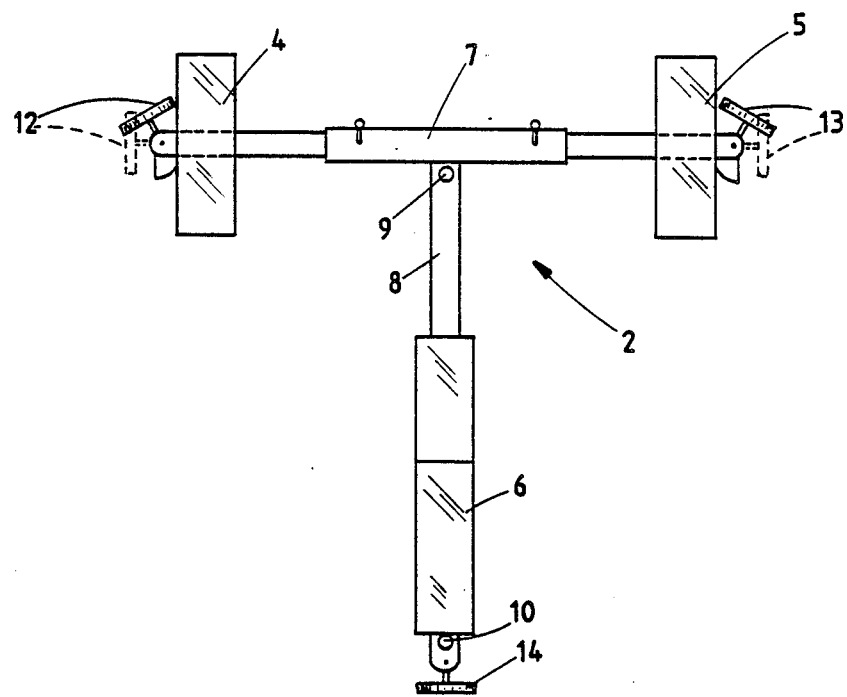

In the following the invention will be disclosed in more detail with reference to an embodiment diagrammatically shown in the drawing, in which FIGS. 1 and 1a show a perspective view of a parking trolley carrying a parked light aircraft, and FIGS. 2 and 2a show a plan view at a slightly larger scale of the parking trolley according to FIGS. 1 and 1a.

In the drawing FIG. 1 shows a light aircraft 1 parked on a parking trolley 2. The landing gear 3 of aircraft 1 is secured by straps or in another known manner to trolley 2, and the same goes for the supporting wheel of the aircraft, nose landing gear 3' in FIG. 1.

Parking trolley 2 is roughly T-shaped and consists of a transverse member 7, and a main member 8, extending orthogonally to member 7 which preferably consist of a cross beam 7 and a main beam 8, which are releasably connected in order to permit the parking trolley to be packed and conveyed in a dismantled state from producer to buyer, which means reduced space for transport and transport costs.

On said beams 7 and 8 three supporting surfaces 4, 5, 6 for the wheels 3, 3' are provided and preferably show a fluted or rough surface to provide for high friction against the aircraft wheels to prevent the wheels from sliding on the supporting surface. Supporting surfaces 4, 5, 6 are preferably designed as roll on/roll off plates with a slightly V-shaped longitudinal section, and are pivoted at the apex of their V-shape in the parking trolley. Consequently, roll on/roll off plates can be turned to the ground with one or the other end to allow aircraft wheels 3,3' to run from one or the other side of said roll on/roll off plates. Also, aircraft wheels 3, 3' will be supported against rolling off forwards as well as backwards in a parked state when the aircraft is clamped to the parking trolley. Roll on/roll off plates 4, 5 may be slid forwards and backwards on cross beam 7 for adaption of their mutual distance to the distance between landing wheels 3,3' of the kind of aircraft in question. Main beam 8 which is connected with cross beam 7 acts as a support for supporting wheel 3' which in FIG. 1 and FIG. 1a is a rear supporting wheel, and a supporting nose wheel 3', respectively. In the embodiment shown in FIG. 1, however, roll on/roll off plates 4, 5 are mutually connected by the aid of telescopic braces extending in cross beam 7, so that the mutual distance between said plates 4, 5 may be varied as mentioned. Such telescopic adjustment may also be incorporated in main beam 8 for adjustment of roll on/roll off plate 6.

The parking trolley according to the shown embodiments has two possible turning points 9 and 10, respectively. When the trolley is used only one turning point 9 or 10 is used and is selected dependent on the position of supporting wheel 3'—in front of or behind landing gear 3. In FIG. 1 turning point 9 is used, which is connected with a foundation 11 in the ground, via a vertical attaching bolt which is connected with turning point 9 in the trolley. This also goes for the alternative embodiment shown in FIG. 1a, where turning point 9 is, however, displaced laterally to the center of main beam 8, which will be described later.

The ends of parking trolley 2, 3, i.e. the free ends of cross beam 7 and main beam 8, are supported by a wheel 12, 13, 14, respectively, each which are rotatable about vertical axes and may be adjusted to and firmly held in at least two positions, preferably in three positions.

As shown in FIGS. 2, 2a, the swingable wheel 12, 13 are lockable in two main positions. In one main position, as shown in a full line in FIGS. 2 and 2a, and wheels 12, 13, 14 are positioned for rolling along a circular path with its center in turning point 10.

In the second main position wheels 12, 13 and, if desired, wheels 14, 14' as well, are positioned in parallel, i.e. with parallel turning axes, for transport of the parking trolley per se or with an attached aircraft If wheels 14, 14' do not adjust in parallel with wheels 12 and 13 during transport of the trolley, this end of trolley 2 must be lifted in connection with an attachment hook on a vehicle to lift wheels 14, 14' from the ground.

The above mentioned positions are adjustable and lockable wheels 12, 13, and 14 can also be positioned in a further position with their turning axes in the same direction as radii to the second turning point 9 of the parking trolley, so that the wheels may run in circular paths with the center in said turning point in the same manner as disclosed above in connection with turning point 10. The choice between turning point 9 or 10 will depend on the undercarriage of the light aircraft.

In FIGS. 1 and 2 only one swingable wheel 14 is shown at the free end of main beam 8. In the alternative embodiment of FIGS. 1a and 2a two wheels 14, 14' are shown, which may be adjusted and locked to roll along circular paths with a turning point 9 or 10 in the same manner as disclosed above.

Wheels 14, 14' are placed laterally of main beam 8, as clearly shown in FIG. 2a, so as not to interfere with roll on/roll off plate 6 and, thus the supporting wheel 3' of the aircraft when the latter is rolled onto and down from the parking trolley.

With the above mentioned positioning of turning points 9, 10 laterally of main beam 8, i.e. outside the longitudinal centre line of the parking trolley, a turning moment is achieved when the wind starts blowing from straight behind the aircraft. Also, the choice of mounting system and its design is less limited, since it will not interfere with supporting wheel 3' when the aircraft is to roll onto or down from the trolley.

I claim:

1. A parking trolley for light aircraft (1) with a couple of landing wheels (3,3), and a nose or rear supporting wheel (3'), comprising a substantially T-shaped frame (2) with supporting surfaces 4, 5 for the landing wheels (3,3), and a supporting surface (6) for the supporting wheel (3'), said T-frame (2) being at one turning point (9) arranged to be freely turnable about a vertical turning axis (11') in relation to a firm attachment (11) in the ground, to which the T-frame is turnably connected, and being supported by freely rotatable supporting members (12, 13, 14) at the two end portions of the T-frame, said parking trolley with a firmly clamped light aircraft swinging upwind in case of a wind load on the rudder of the aircraft, characterized in that the rotatable supporting members (12, 13, 14) consist of supporting wheels (12, 13, 14) having their wheel axes oriented like radii of said turning point (9), and with at least two of them (12,13) on the cross member (7) of T-frame (2) being releasably held and are swingable and lockable in a position with the wheel axes in parallel, preferably orthogonally to the main beam (8) of the T-frame, for turning a parking trolley about the firm point (11), and transport of the trolley with or without an attached aircraft, respectively.

2. A parking trolley as defined in claim 1, characterized in that the cross member (7) and the main member (8) of the T-frame (2) consist of beams (7,8) which support roll on/roll off plates (4,5,6) forming the supporting surfaces (4,5,6).

3. A parking trolley as defined in claim 2, characterized in that roll on/roll off plates (4,5) and cross beam (7) are mutually adjustable towards and away from each other for adaption to the landing gear (3,3) of the aircraft, and that roll on/roll off plate (6) is adjustable forwards and backwards on main beam (8) for adjustment to the supporting wheel (3') of the aircraft.

4. A parking trolley as defined in claim 2, characterized in that roll on/roll off plates (4,5,6) are V-shaped and swingably mounted at the apex of the V-shape for swinging from contact with the ground, i.e. roll on position, up to an attachment position for the aircraft landing gear (3,3').

5. A parking trolley as defined in claim 1, characterized in that two alternative turning points (9 and 10) are provided at a mutual distance along the main member (8) of the T-frame for use in case of light aircraft (1) with a rear supporting wheel (3'), or a supporting nose wheel (3'), respectively being parked.

6. A parking trolley as defined in claims 1 and 5, characterized in that the turning point (9 or possibly 10) is arranged laterally of the center line of main member (8).

7. A parking trolley as defined in claims 2, 3, or 4, characterized in that a roll on/roll off plate (6') is provided centrally on cross member (7) of the T-frame flush with the main member (8) for rolling the aircraft (1) onto/off the parking trolley (2) in both directions.

8. A parking trolley for light aircraft (1) with a couple of landing wheels (3,3), and a nose or rear supporting wheel (3'), comprising a substantially T-shaped frame (2) with supporting surfaces 4,5 for the landing wheels (3,3), and a supporting surface (6) for the supporting wheel (3'), said T-frame (2) being at one turning point (9) arranged to be freely turnable about a vertical turning axis (11') in relation to a firm attachment (11) in the ground, to which the T-frame is turnably connected, and being supported by freely rotatable supporting members (12, 13, 14) at the two end portions of the T-frame, said parking trolley with a firmly clamping light aircraft swinging upwind in case of a wind load on the rudder of the aircraft, characterized in that the rotatable supporting members (12, 13, 14) consist of supporting wheels (12, 13, 14) having their wheel axes oriented like radii of said turning point (9), and with at least two of them (12,13) on the cross member (7) of T-frame (2) being releasably held and are swingable and lockable in a position with the wheel axes in parallel, preferably orthogonally to the main beam (8) of the T-frame, for turning a parking trolley about the firm point (11), and transport of the trolley with or without an attached aircraft, the cross member (7) and the main member (8) of the T-frame (2) consisting of beams (7,8) which support roll on/roll off plates (4,5,6) forming supporting surfaces (4,5,6), wherein the roll on/roll off plates (4,5,6) are V-shaped and swingably mounted at the apex of the V-shape for swinging from contact with the ground, i.e. roll on position, up to an attachment position for the aircraft landing gear (3,3').

* * * * *